July 22, 1958          W. B. POLK          2,844,160

APPARATUS FOR RECOVERING GASES FROM FLARE LINES

Filed Aug. 12, 1955          2 Sheets-Sheet 1

INVENTOR.
W. B. POLK
BY
Hudson & Young
ATTORNEYS

INVENTOR.
W. B. POLK

United States Patent Office 2,844,160
Patented July 22, 1958

2,844,160

APPARATUS FOR RECOVERING GASES FROM FLARE LINES

Walter B. Polk, Borger, Tex., assignor to Phillips Petroleum Company, a corporation of Delaware Application August 12, 1955, Serial No. 528,100

5 Claims. (Cl. 137—115)

This invention relates to an apparatus for recovering gases from flare lines. Heretofore, in plants handling high pressure combustible materials, it has been the practice to connect high pressure lines to a flare line through a series of safety valves. In such cases, if there is leakage of material through the valve, a part of the material is discharged into the flare line and burned. This causes a waste of material which can become quite serious, especially when the product in the high pressure lines is a costly one.

In accordance with this invention, provision is made for the return of material leaking through the relief valve or other relief device to a low pressure part of the plant except when abnormal conditions occur. Thus, the leaking material is normally recovered. However, if there is a dangerous buildup in pressure, the gases are bypassed either directly to the flare line or through a pressure regulator valve. In this manner, complete safety of plant operation is assured, and a considerable quantity of material is recovered which would otherwise be lost to the flare.

Accordingly, it is an object of the invention to provide an improved apparatus for recovering gases leaking to the flare lines without detriment to safety of the operation.

It is a further object to provide an unobstructed connection between the system and the flare when an abnormal condition is encountered.

It is still a further object to provide apparatus of simple construction, long life, and composed of a minimum number of parts to fulfill the foregoing functions.

Various other objects, advantages and features of the invention will become apparent from the following detailed description taken in conjunction with the accompanying drawings, in which.

Figure 1:
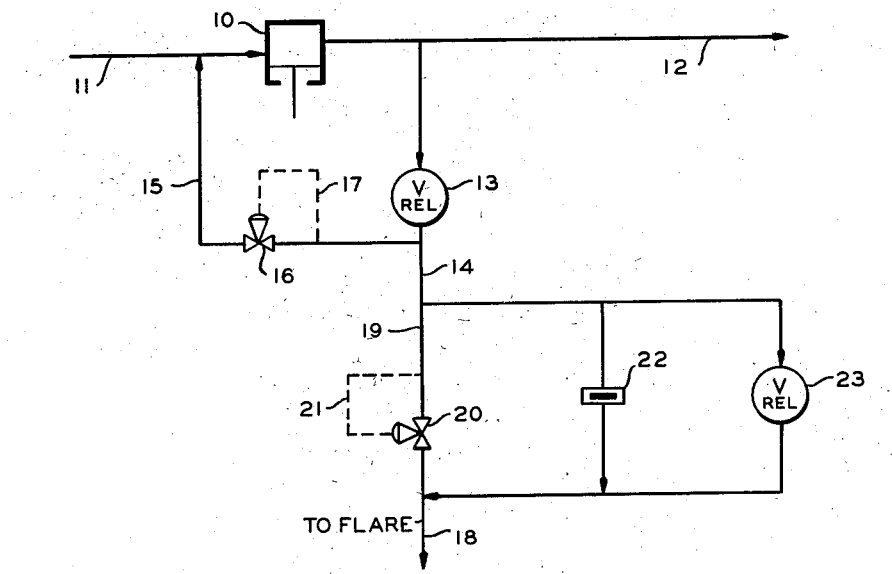
Figure 1 is a schematic diagram of a flare system constructed in accordance with the invention.

Referring now to Figure 1, I have exemplified the application of the invention to a compressor 10 having a low pressure intake line 11 and a high pressure discharge line 12. The high pressure line 12 is connected through a relief valve 13 to a line 14. In some cases, a hand operated valve, such as a plug valve or orbit valve, is used instead of or in parallel with the relief valve 13. This line is, in turn, connected to the low pressure line 11 through a pipe 15 including a pressure regulator represented by a motor valve 16 having a pressure sensing element connected in the pipe 15 upstream of the valve.

The line 14 is further connected to a flare line 18 by a pipe 19 which includes a pressure regulator represented by a motor valve 20 having a sensing element 21 in the pipe 19 upstream of the valve.

The line 14 is further connected to the flare line 18 by a pressure relief device 22 which has the property of withstanding a considerable pressure without permitting the passage of gas therethrough but which, when exposed to a considerable pressure, thereafter permits an uninterrupted flow of gas therethrough. A rupture disc is suitable for this purpose or, alternatively, other relief devices of this character, such as a liquid trap can be used. If desired, other pressure relief devices, such as a relief valve 23, can be connected in parallel with the device 22.

In one operative arrangement, line 11 is operated at a pressure of 3 pounds per square inch gage, line 12 is operated at a pressure of 200 pounds per square inch gage, regulator 16 is set to open at a pressure of 5 pounds per square inch gage and close at a pressure of 3½ pounds per square inch gage. The unit 22 is a rupture disc which breaks at a pressure of 10 pounds per square inch gage, and the regulator 20 is set to open at a pressure of 6 pounds per square inch gage. Thus, regulator 20 is set at a pressure slightly higher than the pressure for which regulator 16 is set, and the disc 22 breaks at a somewhat higher pressure than the set pressure of regulator 20.

It will be apparent, therefore, that under normal conditions of operation any gas leaking through the relief valve 13 will accumulate in line 14 until a pressure of 5 pounds per square inch gage is built up, whereupon the material is returned to the suction line 11 until a pressure of 3½ pounds per square inch gage is reached at line 14. This valve is of relatively small capacity so as not to overload the compressor. Should an abnormal condition occur or the leakage become too severe to be handled by regulator 16, the pressure in line 14 builds up and, when a pressure of 6 pounds per square inch gage is exceeded, the regulator 20, which is of relatively large capacity, opens to discharge the material to the flare. Upon a dangerous pressure condition existing in the line 12 sufficient to cause relief valve 13 to fully open, the pressure builds up to a sufficient extent as to rupture disc 22 whereupon an unobstructed connection is provided between the high pressure line and the flare line. This condition, of course, occurs only when the flow through line 14 is sufficient that it cannot be handled by the regulators 16 and 20. If desired, additional regulator devices, such as the relief valve 23, can be provided to further bypass the rupture disc 22 and regulator 20.

It will be apparent, therefore, that any small leakage through relief valve 13 is normally vented back into the system through pipe 15 and regulator 16 so that no valuable material is lost to the flare under such normal conditions. This is particularly advantageous where a costly material, such as butadiene, is handled by the compressor 10. The regulator 20 permits venting of small quantities of the material to the flare line when upsets of a temporary nature occur which are too large to be handled by regulator 16. At the termination of this temporary condition, the regulator 20, of course, closes so that no further valuable material is vented to the flare therethrough. Only when there is a serious pressure increase or long-lasting upset is the rupture disc broken to provide uninterrupted communication between the line 12 and the flare line with resulting complete safety of the plant operations.

Figure 2:
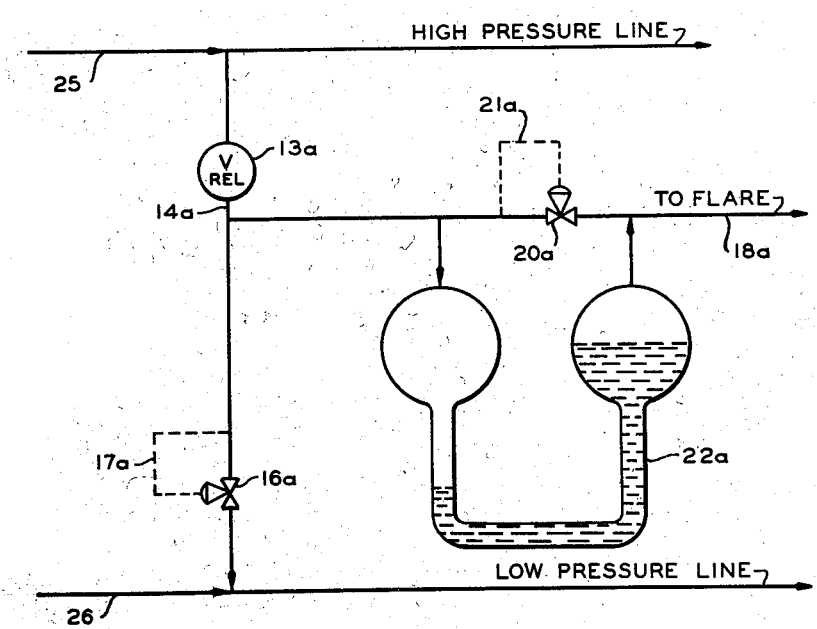
Figure 2 is a schematic view of a modified flare system constructed in accordance with the invention.

In Figure 2, I have shown a modification of the system wherein a valuable product passes through a high pressure line 25. This line is connected through a relief valve 13a and a regulator 16a, 17a to a low pressure part of the system, such as a line 26. A line 14a connects the junction between the relief valve and regulator to a liquid trap 22a and a flare line 18a. A regulator 20a, 21a is connected in parallel with the liquid trap 22a. It will be evident that the operation of the parts is entirely similar to that of the correspondingly numbered parts of Figure 1, the liquid being discharged from one side of the trap 22a to the other side when an excessive pressure is encountered. Thus, the system of Figure 2, like that of Figure 1, prevents venting of the valuable product to the flare line under normal conditions, and provides a temporary communication to the flare line in the case of an upset.

Figure 3:
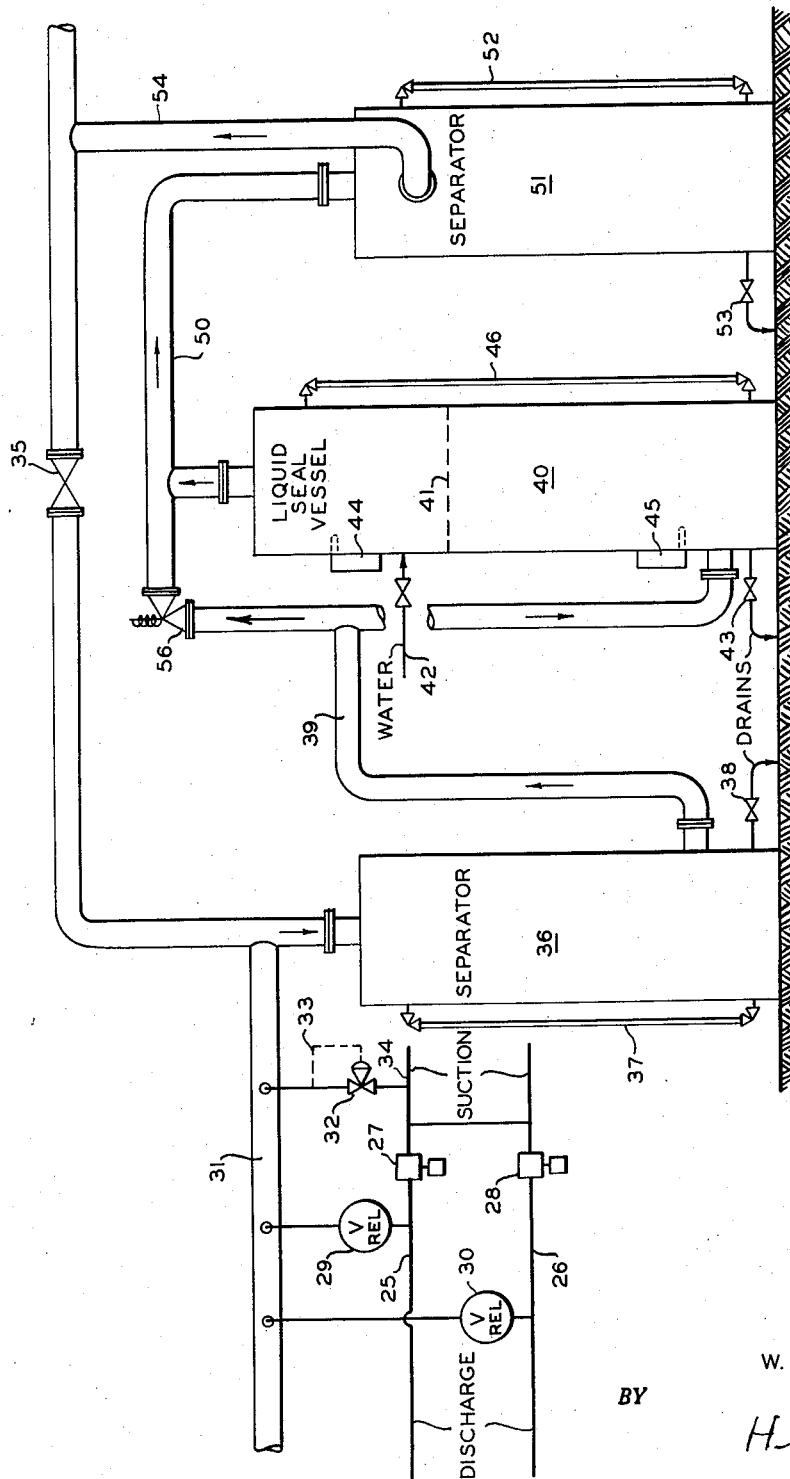
Figure 3 is a view of still another modification.

In Figure 3, I have shown a modification of the system wherein a valuable product passes through lines 25, 26, which can be the discharge lines of compressors 27 and 28, respectively. These lines are further connected by relief valves 29 and 30, respectively to a flare line 31. A regulator valve 32, of low capacity and having a pressure sensing element 33, connects the flare line 31 to a common suction line 34 of the compressors.

Connected in parallel with a valve 35 in the flare line is a system including a separator vessel 36 having a sight gage 37 and a drain 38. The lower portion of the vessel 36 is connected by a conduit 39 to a liquid seal vessel 40 in which a liquid level 41 is maintained. The vessel 40 has a valved water line 42, a drain line 43, a high level alarm 44, a low level alarm 45 and a sight gage 46. The top of this vessel is connected by a line 50 to a separator vessel 51 having a sight gage 52 and a drain line 53. An outlet at the upper portion of this vessel is connected by a line 54 to the flare line 31 downstream of the valve 35. The vessel 40 is bypassed by a relief valve 56.

The operation of the system is generally the same as Figure 1 in that material leaking through the relief valves 29, 30 normally is bypassed to the suction of the compressors by regulator 32. However, if there is too much leakage to be handled by this valve or the pressure builds up, material is vented to the flare line through the relief valve 56 and vessel 51. If a dangerous condition arises, the liquid, such as water, in vessel 40 is blown into the vessel 51 so that unobstructed communication between the line 31 upstream of valve 35 and the line downstream of this valve is effected through vessels 36, 40 and 51. Valve 35 is provided to bypass the entire system for shutdown or maintenance.

It will be evident that the level in each of the vessels 36, 40 and 51 can be readily observed, and that an alarm is sounded whenever the liquid in the vessel 41 rises to an abnormally high level or falls to an abnormally low level, the former condition indicating that an excessive head is being maintained in the vessel, and the latter condition indicating either that the head in the vessel 40 is too small or that a dangerous condition has caused the liquid in this vessel to be blown out into the vessel 51 with resulting unobstructed communication between the two sections of the flare line.

While the invention has been described in connection with present preferred embodiments thereof, it is to be understood that this description is illustrative only and is not intended to limit the invention.

I claim:

1. In a gas-handling system having a high pressure portion and a low pressure portion, a relief valve connected to said high pressure portion, first valve means connecting the outlet of said relief valve to said low pressure portion, said valve means being set to open when the pressure at the relief valve outlet rises to a first predetermined value, a flare line, second valve means connecting the relief valve outlet to the flare line, said second valve means opening when the pressure at the relief valve outlet rises to a second predetermined value higher than said first predetermined value, and said second valve means closing upon a pressure drop at the relief valve outlet, and a device connecting said relief valve outlet to said flare line, said device being arranged to provide unobstructed communication between the relief valve outlet and the flare line when the pressure at the relief valve outlet rises above a third predetermined value higher than said second predetermined value.

2. The apparatus of claim 1 wherein said device is a rupture disc.

3. In a gas-handling system having a high pressure portion and a low pressure portion, a relief valve connected to said high pressure portion, a first valve means connecting the outlet of said relief valve to said low pressure portion, said valve means being set to open when the pressure at the relief valve outlet rises to a first predetermined value, a flare line, a second valve means connecting the relief valve outlet to the flare line, said second valve means opening when the pressure at the relief valve outlet rises to a second predetermined value higher than said first predetermined value, said second valve means closing upon a pressure drop at the relief valve outlet, a device connecting said relief valve outlet to said flare line, said device being arranged to provide unobstructed communication between the relief valve outlet and the flare line when the pressure at the relief valve outlet rises above a third predetermined value higher than said second predetermined value, and a relief valve connected in parallel with said device, said last-mentioned relief valve opening at a pressure intermediate said second and said third predetermined pressures.

4. In a gas-handling system, in combination, a compressor having a suction line and a discharge line, a relief valve connected to said discharge line, first valve means connecting the relief valve outlet to said suction line, said valve means being arranged to open at a first predetermined pressure and to close at a second predetermined pressure lower than said first predetermined pressure, a flare line, a second valve means connecting the relief valve outlet to said flare line, said second valve means being arranged to open at a third predetermined pressure higher than said first predetermined pressure, and a pressure release device connecting the outlet of said relief valve to said flare line, said device being arranged to provide an obstructed connection between the relief valve outlet and the flare line when the pressure at the relief valve outlet reaches a fourth predetermined pressure higher than said third predetermined pressure.

5. In a gas-handling system, in combination, a compressor having a suction line and a discharge line, a relief valve connected to said discharge line, a first valve means connecting the relief valve outlet to said suction line, said valve means being arranged to open at a first predetermined pressure and to close at a second predetermined pressure lower than said first predetermined pressure, a flare line, a second valve means connecting the relief valve outlet to said flare line, said second valve means being arranged to open at a third predetermined pressure higher than said first predetermined pressure, a frangible disc connecting the outlet of said relief valve to said flare line, said disc being constructed and arranged to rupture and thus provide an unobstructed connection between the relief valve outlet and the flare line when the pressure at the relief valve outlet reaches a fourth predetermined pressure higher than said third predetermined pressure, and a relief valve connected in parallel with said frangible disc, said last-mentioned relief valve being arranged to open at a pressure intermediate said third and fourth predetermined pressures.

References Cited in the file of this patent

UNITED STATES PATENTS

| 730,807 | Toltz et al. | June 9, 1903 |
| 2,348,104 | Beddoes | May 2, 1944 |
| 2,734,562 | Haberle et al. | Feb. 14, 1956 |